(12) United States Patent
Iwano

(10) Patent No.: US 10,730,562 B2
(45) Date of Patent: Aug. 4, 2020

(54) PILLAR STRUCTURE

(71) Applicant: TOYOTA JIDOSHA KABUSHIKI KAISHA, Toyota-shi (JP)

(72) Inventor: Yoshihiro Iwano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 30 days.

(21) Appl. No.: 16/243,132

(22) Filed: Jan. 9, 2019

(65) Prior Publication Data

US 2019/0241218 A1   Aug. 8, 2019

(30) Foreign Application Priority Data

Feb. 8, 2018  (JP) .................................. 2018-021012

(51) Int. Cl.
| | |
|---|---|
| *B62D 25/04* | (2006.01) |
| *B62D 25/02* | (2006.01) |
| *B60R 13/07* | (2006.01) |
| *B62D 27/02* | (2006.01) |

(52) U.S. Cl.
CPC ............. *B62D 25/04* (2013.01); *B62D 27/02* (2013.01); *B60R 13/07* (2013.01)

(58) Field of Classification Search
CPC .......... B62D 25/02; B62D 25/04; B60R 13/07

USPC .................. 296/193.06, 198, 96.21, 208
See application file for complete search history.

(56) References Cited

U.S. PATENT DOCUMENTS

2015/0266512 A1    9/2015  Iwano et al.

FOREIGN PATENT DOCUMENTS

| CN | 102381359 A | 3/2012 |
| JP | 2008-162415 A | 7/2008 |
| JP | 2014-83880 A | 5/2014 |

*Primary Examiner* — Dennis H Pedder
(74) *Attorney, Agent, or Firm* — Oblon, McClelland, Maier & Neustadt, L.L.P.

(57) ABSTRACT

A pillar structure of a vehicle including a glass attachment surface configured to have a windshield of the vehicle or a rear window of the vehicle attached thereto, a side part outer surface configured to have an upper edge of the fender panel extending in a front-rear direction of the vehicle connected thereto downwardly, a protruding corner portion configured to be provided to protrude to the fender panel along a pillar extending direction at a corner of a lower end on the side part outer surface on the glass attachment surface side such that an angle formed by a protruding direction and the upper edge of the fender panel is in a predetermined acute angle range in a side view, and a recess bead configured to be formed on the glass attachment surface along the protruding corner portion.

2 Claims, 6 Drawing Sheets

PILLAR STRUCTURE

TECHNICAL FIELD

The present disclosure relates to a pillar structure of the vehicle.

BACKGROUND

In the related art, Japanese Unexamined Patent Publication No. 2008-162415 is known as a technical literature related to a pillar structure of a vehicle. This patent literature discloses an attachment structure of a fender panel for a front pillar of a vehicle.

CROSS-REFERENCE TO RELATED APPLICATION

This application claims the benefit of priority from Japanese Patent Application No. 2018-021012, filed Feb. 8, 2018, the entire contents of which are incorporated herein by reference.

SUMMARY

Incidentally, in order to improve the appearance of a connection portion between a pillar and a fender panel, it has been considered to provide sharpness to the pillar by providing an acute angle part in the connection portion. However, there has been a problem that wrinkles are generated when an acute angle part is formed in a pillar by drawing.

Accordingly, in this technical field, it is desired to provide a pillar structure in which a connection portion between a pillar structure and a fender panel has a sharp pillar shape and generation of wrinkles due to drawing can be reduced.

According to an aspect of the present disclosure, there is provided a pillar structure to which a fender panel of a vehicle is connected. The pillar structure includes a glass attachment surface configured to have a windshield of the vehicle or a rear window of the vehicle attached thereto, a side part outer surface configured to be positioned in a side part on the glass attachment surface and, have an upper edge of the fender panel extending in a front-rear direction of the vehicle connected thereto downwardly, a protruding corner portion configured to be provided to protrude to the fender panel along a pillar extending direction at a corner of a lower end on the side part outer surface on the glass attachment surface side such that an angle formed by a protruding direction and the upper edge of the fender panel is in a predetermined acute angle range in a side view, and a recess bead configured to be formed on the glass attachment surface along the protruding corner portion.

In the pillar structure according to the aspect of the present disclosure, the protruding corner portion protruding to the fender panel along the pillar extending direction is provided at the corner of the lower end on the side part outer surface on the glass attachment surface side such that the angle formed by the protruding direction of the protruding corner portion and the upper edge of the fender panel (the upper edge extending in the front-rear direction of the vehicle) is in the predetermined acute angle range. Therefore, a connection portion between the pillar structure and the fender panel can have a sharp pillar shape, and the appearance can be improved. Moreover, according to this pillar structure, the recess bead is formed on the glass attachment surface along the protruding corner portion. Therefore, the length of a line on the glass attachment surface in a pillar cross section can be ensured, and generation of wrinkles due to the protruding corner portion formed by drawing can be reduced.

In the pillar structure according to the aspect of the present disclosure, the recess bead may be configured to extend to an lower end portion of the glass attachment surface.

According to this pillar structure, the recess bead extends to the lower end portion of the glass attachment surface. Therefore, even if water flows into a pillar side when it rains, the water can flow to the lower part of the vehicle through the recess bead, so that accumulation of water can be reduced.

According to the aspect of the present disclosure, it is possible to provide a pillar structure in which the connection portion between the pillar structure and the fender panel has a sharp pillar shape and generation of wrinkles due to drawing can be reduced.

DETAILED DESCRIPTION

Hereinafter, an embodiment of the present disclosure will be described with reference to the drawings.

Figure 1:
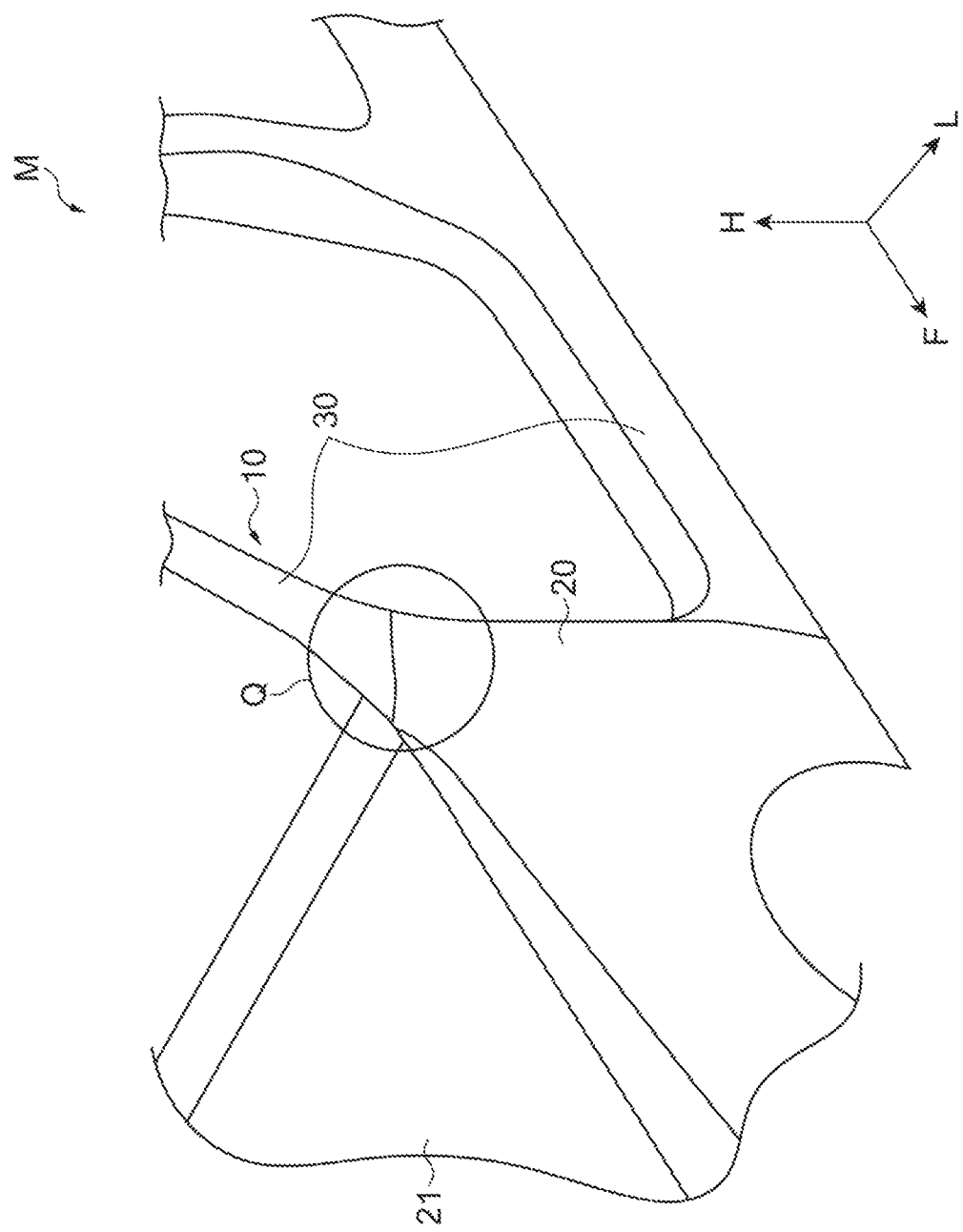
FIG. 1 is a perspective view illustrating a part of a vehicle seen from a left front side.

FIG. 1 is a perspective view illustrating a part of a vehicle seen from a left front side. FIG. 1 illustrates a vehicle (vehicle body) M, a front pillar 10, a fender panel 20, and a hood panel 21. A range Q in FIG. 1 illustrates a connection portion between the front pillar 10 and the fender panel 20. The front pillar 10 has a pillar structure according to the present embodiment. In addition, FIG. 1 is illustrated in a three-dimensional orthogonal coordinate system having a forward direction F of the vehicle, a left direction L of the vehicle, and an upward direction H of the vehicle.

As illustrated in FIG. 1, the front pillar 10 is configured to have a side outer panel 30 and a side inner panel (not illustrated) constituting a side portion of the vehicle. The front pillar 10 is realized by forming a closed cross section by welding in which flanges of a front edge and a rear edge made of metal having rigidity in the side outer panel 30 and the side inner panel overlap each other. The configuration of the front pillar 10 is not limited to the contents described above.

The fender panel 20 is connected to a lower side of the front pillar 10. The fender panel 20 is a panel disposed around a tire on a side surface of a vehicle front portion. The fender panel 20 is disposed on the right and left sides of the hood panel 21 of the vehicle. The hood panel 21 is disposed to cover an engine compartment (not illustrated) of the vehicle from above and is configured to be able to be opened and closed to an upper side.

Figure 2:
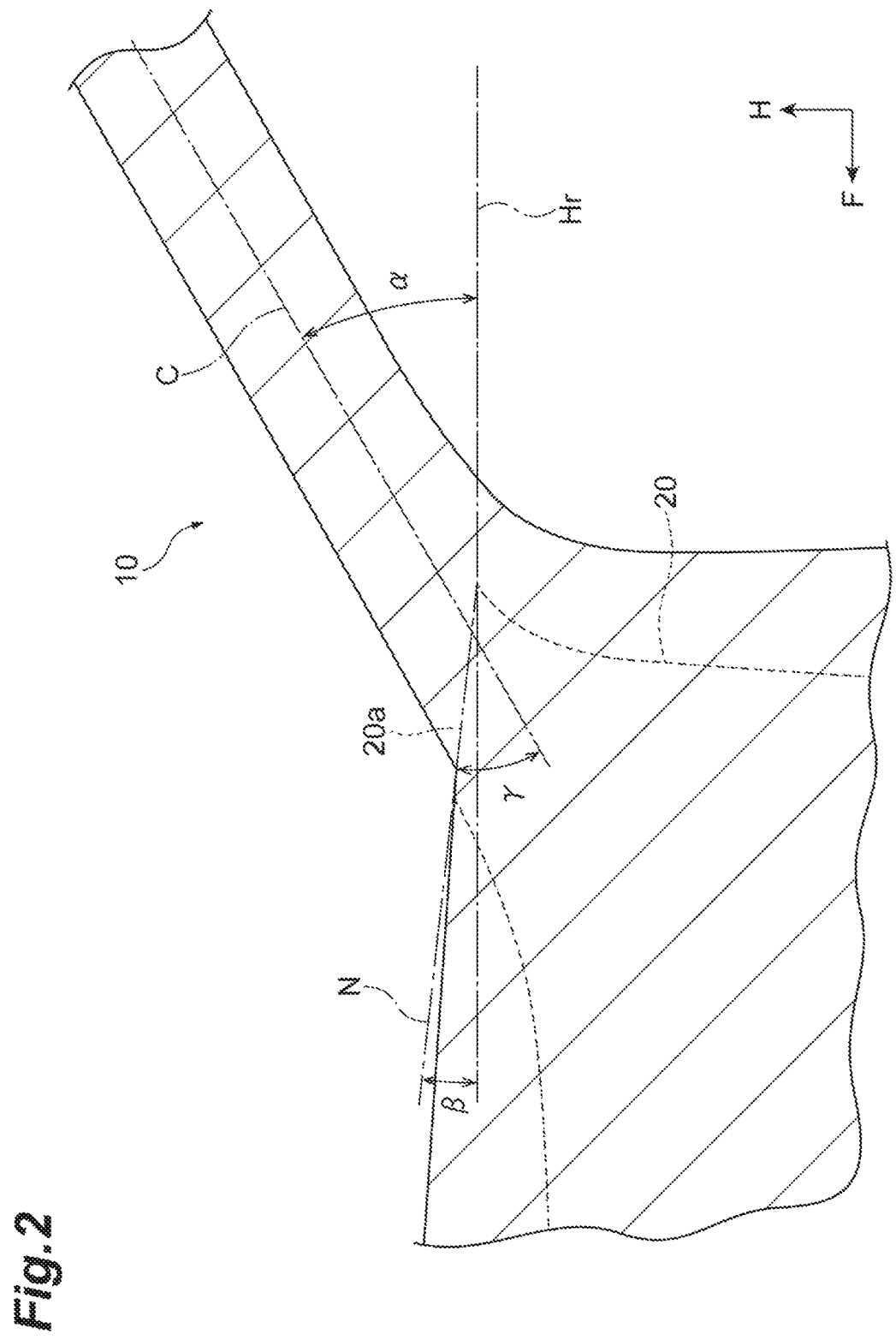
FIG. 2 is a view for describing an angle between a front pillar and a fender panel.

FIG. 2 is a view for describing an angle between the front pillar 10 and the fender panel 20. FIG. 2 is a schematic diagram in a side view (a schematic diagram seen from a side part of the vehicle). FIG. 2 illustrates a central axis C of the front pillar 10, a virtual line Hr extending in a front-rear direction of the vehicle, and an upper edge 20a of the fender panel 20. In addition, FIG. 2 illustrates an extension line N extended from the upper edge 20a of the fender panel 20.

In FIG. 2, α indicates an angle formed by the central axis C of the front pillar 10 and the virtual line Hr. For example, the virtual line Hr is a horizontal line with respect to the ground where the vehicle is located, and the angle α corresponds to the inclination of the front pillar 10 when the vehicle is seen in a side view. From the viewpoint of the appearance, the angle α can be an angle ranging from 3 degrees to 60 degrees. The angle α may be an angle ranging from 5 degrees to 45 degrees.

As illustrated in FIG. 2, the upper edge 20a of the fender panel 20 extends in the front-rear direction of the vehicle. Here, β indicates an angle formed by the extension line N of the upper edge 20a and the virtual line Hr. The angle β is an inclination of the upper edge 20a of the fender panel 20. The angle β can be an angle ranging from 0 degrees to 30 degrees from the virtual line Hr while having the clockwise direction as a positive value. The angle β may be an angle ranging from 5 degrees to 20 degrees.

The upper edge 20a of the fender panel 20 need only be provided along the front-rear direction of the vehicle when seen from the side part of the vehicle. The upper edge 20a of the fender panel 20 may incline obliquely downward to the front side the vehicle. In addition, in FIG. 2, γ indicates an angle formed by the central axis C of the front pillar 10 and the extension line N of the upper edge 20a. The angle γ will be described below in detail.

Figure 3:
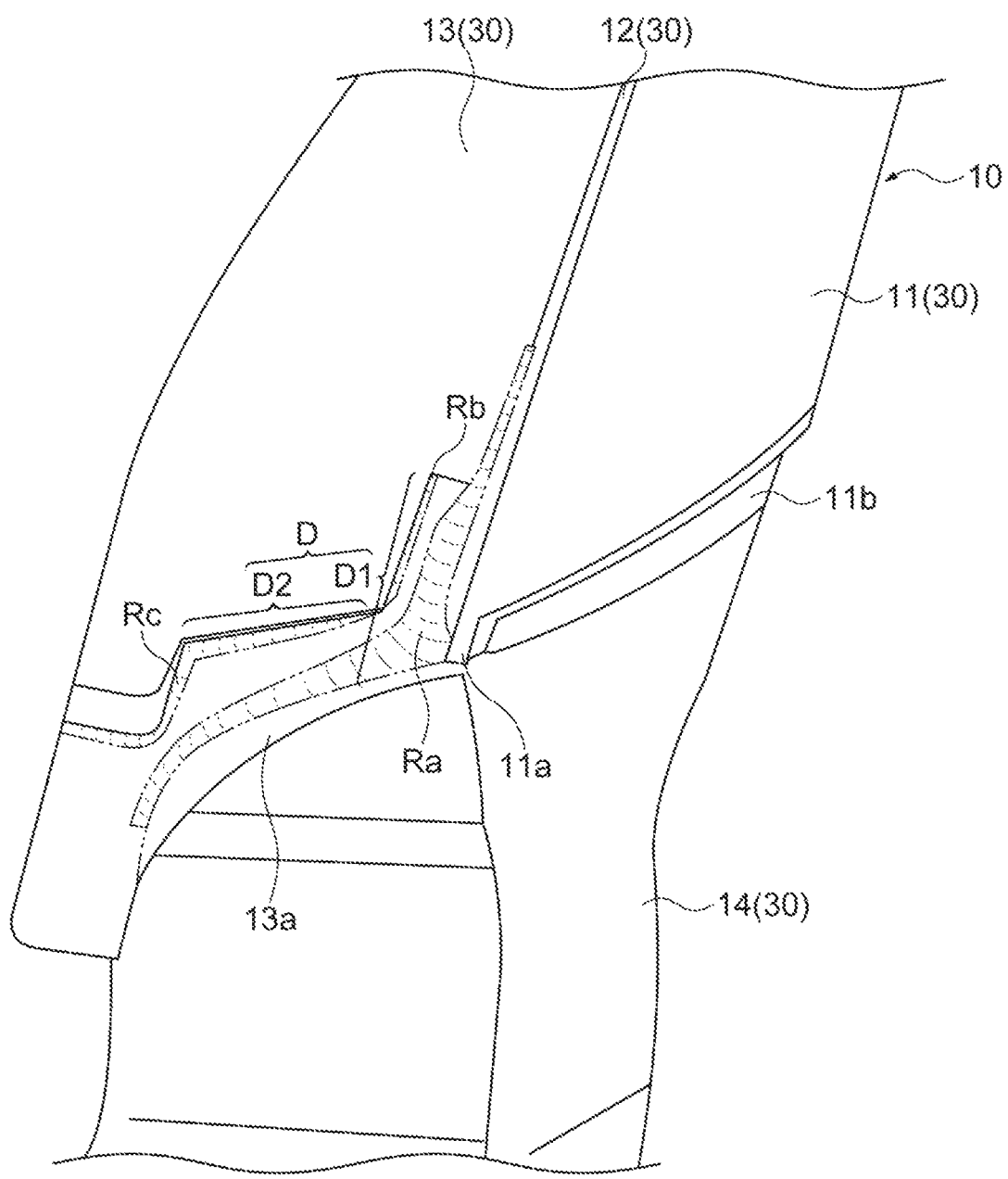
FIG. 3 is a perspective view illustrating the front pillar.

FIG. 3 is a perspective view illustrating the front pillar 10. FIG. 3 illustrates a part corresponding to the range Q of connection between the front pillar 10 and the fender panel 20 illustrated in FIG. 1. FIG. 3 illustrates a side part outer surface 11, a stepped surface 12, a glass attachment surface 13, and a fender panel corresponding surface 14. Other reference signs will be described below.

The side part outer surface 11 is a surface of the front pillar 10 on the outer side of the vehicle body positioned in the side part of the vehicle. The side part outer surface 11 is positioned on the upper side of the front pillar 10. In addition, at least a part of the side part outer surface 11 is exposed in the side part of the vehicle. For example, a side window glass of the vehicle is disposed on the side part outer surface 11 on a rear part side of the vehicle. The side part outer surface 11 is positioned in the side part of the glass attachment surface 13 in the front pillar 10, and the fender panel corresponding surface 14 is positioned in the lower part of the side part outer surface 11. In the present embodiment, the side part outer surface 11 illustrated in FIG. 3 is positioned on the left side of the vehicle.

Figure 4:
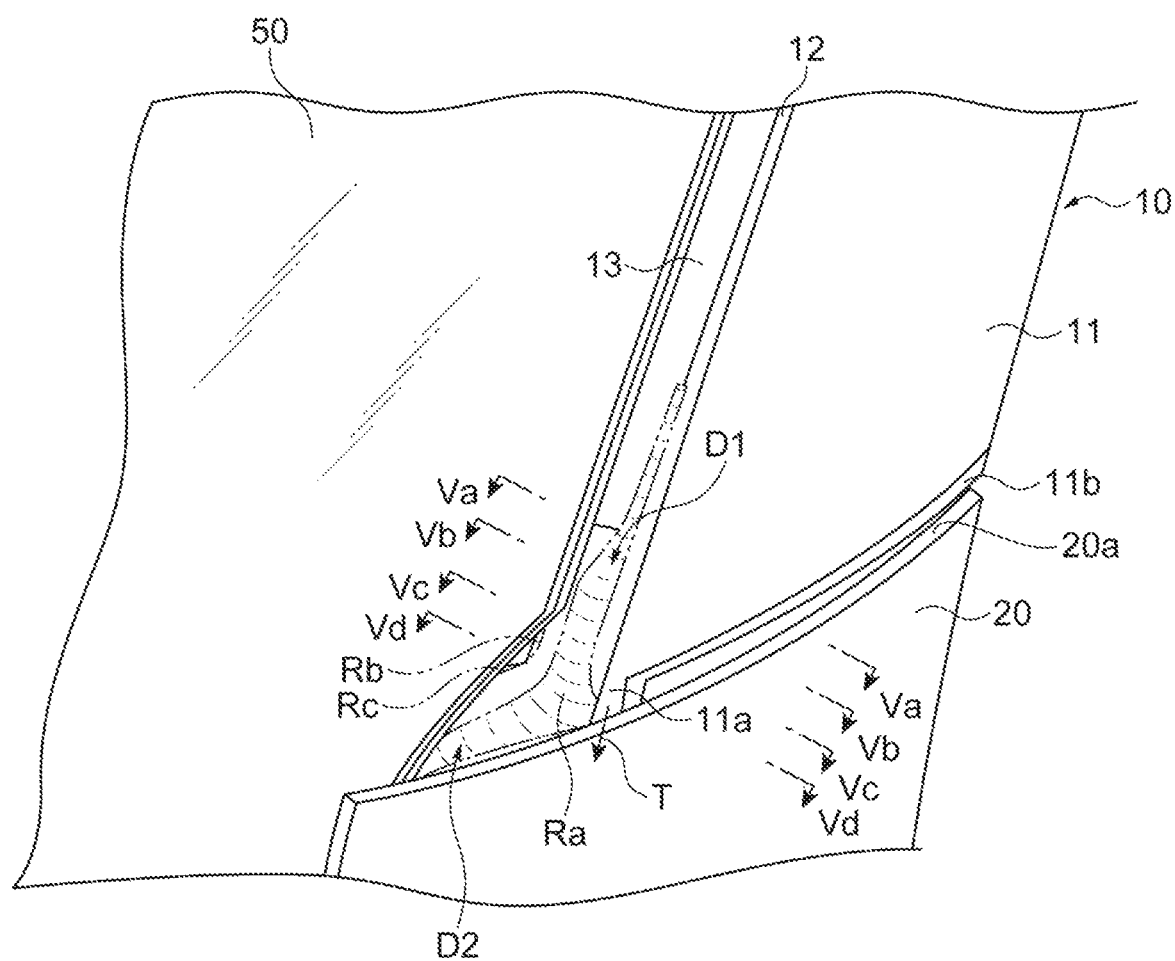
FIG. 4 is a perspective view illustrating the front pillar to which a windshield and the fender panel are connected.

Here, FIG. 4 is a perspective view illustrating the front pillar 10 to which a windshield 50 and the fender panel 20 are connected. FIG. 4 illustrates the windshield 50. As illustrated in FIG. 4, the upper edge 20a of the fender panel 20 is connected thereto downwardly. In FIG. 4, the fender panel 20 is disposed to cover at least a part of the fender panel corresponding surface 14 illustrated in FIG. 3.

As illustrated in FIGS. 3 and 4, a protruding corner portion 11a is formed at a lower end of the side part outer surface 11. The protruding corner portion 11a is a part of the side part outer surface 11. The protruding corner portion 11a is provided to protrude to the fender panel 20 along a pillar extending direction at a corner of the lower end of the side part outer surface 11 on the glass attachment surface 13 side. The pillar extending direction corresponds to an extending direction of the central axis C of the front pillar 10 illustrated in FIG. 2. The protruding corner portion 11a is exposed to the outside except for a tip part. The protruding corner portion 11a in its entirety may be exposed to the outside.

In a side view, the protruding corner portion 11a is formed such that an angle formed by its protruding direction and the upper edge 20a of the fender panel 20 is in a predetermined acute angle range. In FIG. 4, the protruding direction of the protruding corner portion 11a is indicated with an arrow T. The predetermined acute angle range can range from 3 degrees to 60 degrees. The predetermined acute angle range can range from 5 degrees to 45 degrees.

Here, the protruding direction of the protruding corner portion 11a illustrated in FIG. 3 lies along the pillar extending direction. In the present embodiment, when seen from the side part of the vehicle, the protruding direction of the protruding corner portion 11a coincides with the extending direction of the central axis C of the front pillar 10 illustrated in FIG. 2. Therefore, in the present embodiment, the angle formed by the protruding direction of the protruding corner portion 11a and the upper edge 20a of the fender panel 20 corresponds to the angle γ illustrated in FIG. 2. The angle γ satisfies the predetermined acute angle range described above. The protruding direction of the protruding corner portion 11a does not necessarily coincide with the pillar extending direction. The angle formed by the protruding direction of the protruding corner portion 11a and the pillar extending direction can be within an angle range of ±10 degrees having the clockwise direction as a positive value. This range may be a range of ±5 degrees or may be a range of ±3 degrees.

As illustrated in FIGS. 3 and 4, a stepped portion 11b is formed at a lower edge of the side part outer surface 11 to be recessed toward the inner side of the front pillar 10. In the present embodiment, the stepped portion 11b is formed in two stages. The stepped portion 11b is formed at the lower edge of the side part outer surface 11 except for the protruding corner portion 11a. The stepped portion 11b is not necessarily formed in two stages and does not have to be provided.

Figure 5A:
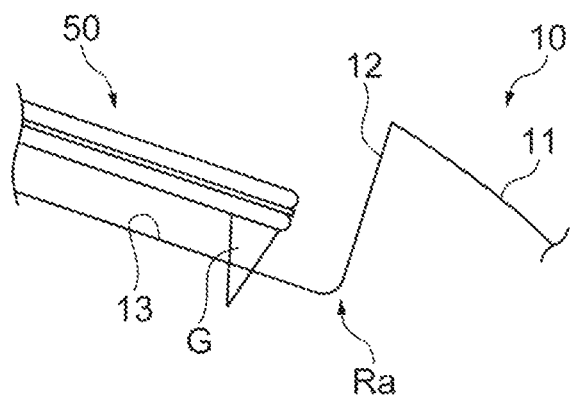
FIG. 5A is an end surface view taken along line Va-Va in FIG. 4.

The stepped surface 12 is a surface provided between the side part outer surface 11 and the glass attachment surface 13. Here, FIG. 5A is an end surface view taken along line Va-Va in FIG. 4. FIG. 5A illustrates a bonded portion G of the windshield 50. As illustrated in FIG. 5A, the stepped surface 12 is formed as a surface connecting the side part outer surface 11 and the glass attachment surface 13 having different heights in a radial direction of the front pillar 10. The stepped surface 12 is formed along the pillar extending direction.

The glass attachment surface 13 is a surface which faces the front side of the vehicle and to which the windshield 50 of the vehicle is attached. As illustrated in FIG. 5A, an end portion of the windshield 50 is fixed to the glass attachment surface 13 via the bonded portion G. The windshield 50 is not necessarily fixed to the glass attachment surface 13 in a direct manner.

As illustrated in FIGS. 3, 4, and 5A, a recess bead D is formed on the side part outer surface 11 side of the glass attachment surface 13. The recess bead D is a bead (a groove portion) formed to be recessed to the inner side of the front pillar 10. The recess bead D extends to the lower end portion of the glass attachment surface 13. The recess bead D extending to the lower end portion of the glass attachment surface 13 denotes a configuration in which rain water or the like that has entered the recess bead D flows along the recess bead D and is discharged to the lower part. There is no need for the recess bead D to extend to reach the lower end (the lower edge) of the glass attachment surface 13. The recess bead D need only reach a position at which rain water or the like that has entered the recess bead D can be appropriately discharged. The lower end portion of the glass attachment surface 13 is not limited to the end of the glass attachment surface 13 in a strict sense. The lower end portion of the glass attachment surface 13 includes a range as long as the end portion thereof is within a range in which rain water or the like that has entered the recess bead D can be discharged from the front pillar 10 to the lower part of the vehicle.

The recess bead D has a first recess bead D1 extending in the pillar extending direction, and a second recess bead D2 extending along the lower edge of the glass attachment surface 13.

Figure 5B:
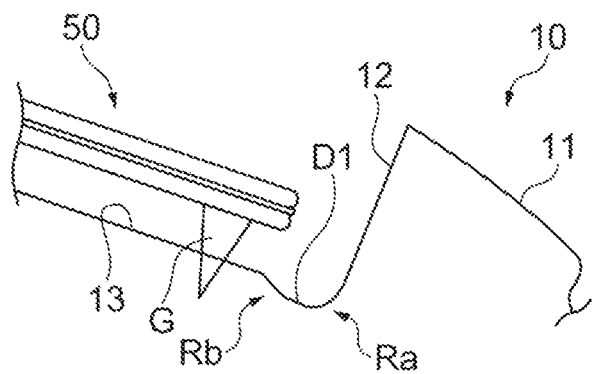
FIG. 5B is an end surface view taken along line in FIG. 4.
Figure 5C:
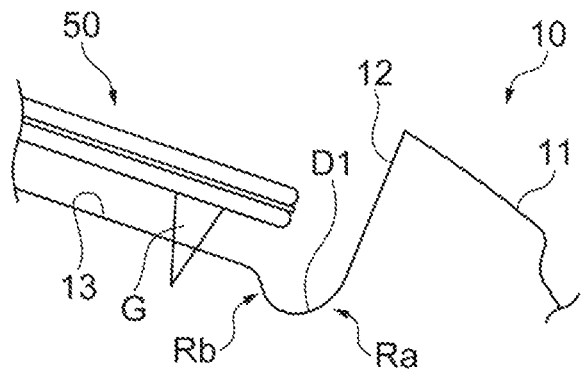
FIG. 5C is an end surface view taken along line Vc-Vc in FIG. 4.
Figure 5D:
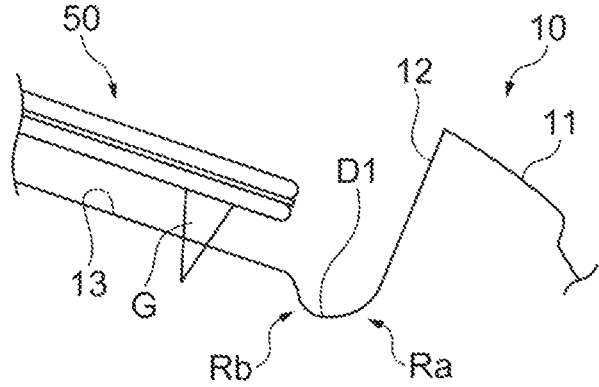
FIG. 5D is an end surface view taken along line Vd-Vd in FIG. 4.

The first recess bead D1 is a part of the recess bead D extending in the pillar extending direction along the protruding corner portion 11a of the side part outer surface 11. The first recess bead D1 will be described with reference to FIGS. 4 and 5A to 5D. FIG. 5B is an end surface view taken along line Vb-Vb in FIG. 4. FIG. 5C is an end surface view taken along line Vc-Vc in FIG. 4. FIG. 5D is an end surface view taken along line Vd-Vd in FIG. 4.

As illustrated in FIGS. 4 and 5A to 5D, the first recess bead D1 is formed such that the recessed amount increases toward the lower part of the front pillar 10 while being closer to the protruding corner portion 11a. The recessed amount of the first recess bead D1 may be uniform after being close to the protruding corner portion 11a (refer to FIGS. 5C and 5D). The maximum value for the recessed amount can range from 1 mm to less than 2 mm. The maximum value for the recessed amount may be less than 1 mm and may be 2 mm or greater.

In addition, in the first recess bead D1, corners at both ends in a cross section are rounded. A corner part of the first recess bead D1 on the side part outer surface 11 side is indicated as a first corner portion Ra, and a corner part on the opposite side (the windshield 50 side) of the side part outer surface 11 is indicated as a second corner portion Rb. FIGS. 3 and 4 illustrate the ranges of the first corner portion Ra and the second corner portion Rb which are rounded.

The first corner portion Ra corresponds to the connection portion between the stepped surface 12 and the glass attachment surface 13. The stepped surface 12 and the glass attachment surface 13 are smoothly connected to each other in the first corner portion Ra of the first recess bead D1. An upper end of the first corner portion Ra extends upward beyond the first recess bead D1. In addition, the lower side of the first corner portion Ra forms a corner portion of the second recess bead D2 beyond the first recess bead D1. There is no need for an upper portion of the first corner portion Ra to extend upward beyond the first recess bead D1.

As illustrated in FIGS. 5A to 5D, the first corner portion Ra may be formed such that the curvature of radius increases while being closer to the protruding corner portion 11a. As an example, the first corner portion Ra can have the curvature of radius of 2.8 mm at the upper end and can have the curvature of radius ranging from 8 mm to less than 10 mm in a part close to the protruding corner portion 11a. Providing such a first corner portion Ra is effective in minimizing generation of wrinkles when the front pillar 10 is formed by drawing.

The second corner portion Rb corresponds to a corner of the first recess bead D1 on the windshield 50 side. The second corner portion Rb smoothly connects a surface, to which the windshield 50 is attached on the glass attachment surface 13, and a bottom surface of the first recess bead D1 to each other. The second corner portion Rb may also be formed such that the curvature of radius increases while being closer to the protruding corner portion 11a.

The second recess bead D2 illustrated in FIG. 3 is a part of the recess bead D extending along the lower edge of the glass attachment surface 13. The lower edge of the glass attachment surface 13 (the lower edge in the vicinity of the protruding corner portion 11a) is formed to have a curved shape toward the lower part of the vehicle while being away from the side part outer surface 11, and the second recess bead D2 also extends toward the lower part of the vehicle while being closes to a middle side of the vehicle along the lower edge of the glass attachment surface 13.

In the second recess bead D2 as well, the corners at both ends in a cross section (a cross section orthogonal to the extending direction) are rounded (not illustrated). A corner part of the second recess bead D2 on the upper side is indicated as a third corner portion Rc. A corner part of the second recess bead D2 on the lower side corresponds to the lower side of the first corner portion Ra.

The second recess bead D2 extends from the first recess bead D1 in a lateral direction, thereby extending to the lower end portion of the glass attachment surface 13, and its lower end is open toward the lower part of the vehicle. Rain water that has entered the recess bead D enters the second recess bead D2 through the first recess bead D1 and is discharged toward the lower part of the vehicle from the lower end or the like of the second recess bead D2.

At the lower edge of the glass attachment surface 13, an appearance improvement bead 13a is provided along the lower edge in a part lower than the second recess bead D2. For example, the appearance improvement bead 13a can be formed by slightly folding the lower edge of the glass attachment surface 13 to the outer side of the front pillar 10. The appearance improvement bead 13a is not necessarily formed. In this case, the first recess bead D1 may be configured to extend to the lower end portion of the glass attachment surface 13 such that water is discharged.

In the pillar structure according to the present embodiment described above, since the protruding corner portion 11a protruding along the pillar extending direction is provided at the corner of the lower end on the side part outer surface 11 on the glass attachment surface 13 side, and the angle formed by the protruding direction of the protruding corner portion 11a and the upper edge of the fender panel (the upper edge extending in the front-rear direction of the vehicle) is in the predetermined acute angle range, the connection portion between the pillar structure and the fender panel 20 can have a sharp pillar shape, and the appearance can be improved. Moreover, according to this pillar structure, since the recess bead D is formed on the glass attachment surface 13 along the protruding corner portion 11a, the length of a line on the glass attachment surface 13 in a pillar cross section can be ensured, and generation of wrinkles due to the protruding corner portion 11a formed by drawing can be reduced.

Moreover, according to this pillar structure, since the recess bead D extends to the lower end portion of the glass attachment surface 13, even if water flows into a pillar side when it rains, the water can flow to the lower part of the vehicle through the recess bead D, so that accumulation of water can be reduced.

Hereinabove, the preferable embodiment of the present disclosure has been described. The present disclosure is not limited to the embodiment described above. The present disclosure can be performed in various forms including the embodiment described above subjected to various changes and modifications based on the knowledge of those skilled in the art.

For example, the recess bead D according to the present embodiment does not necessarily extend to the lower end portion of the glass attachment surface 13. That is, the recess bead D is not necessarily configured to discharge water to the lower part of the vehicle. In addition, the recess bead D does not necessarily have the second recess bead D2. In addition, the length of the first recess bead D1 need only be in a range in which wrinkles generated by forming the protruding corner portion 11a can be reduced.

Figure 6:
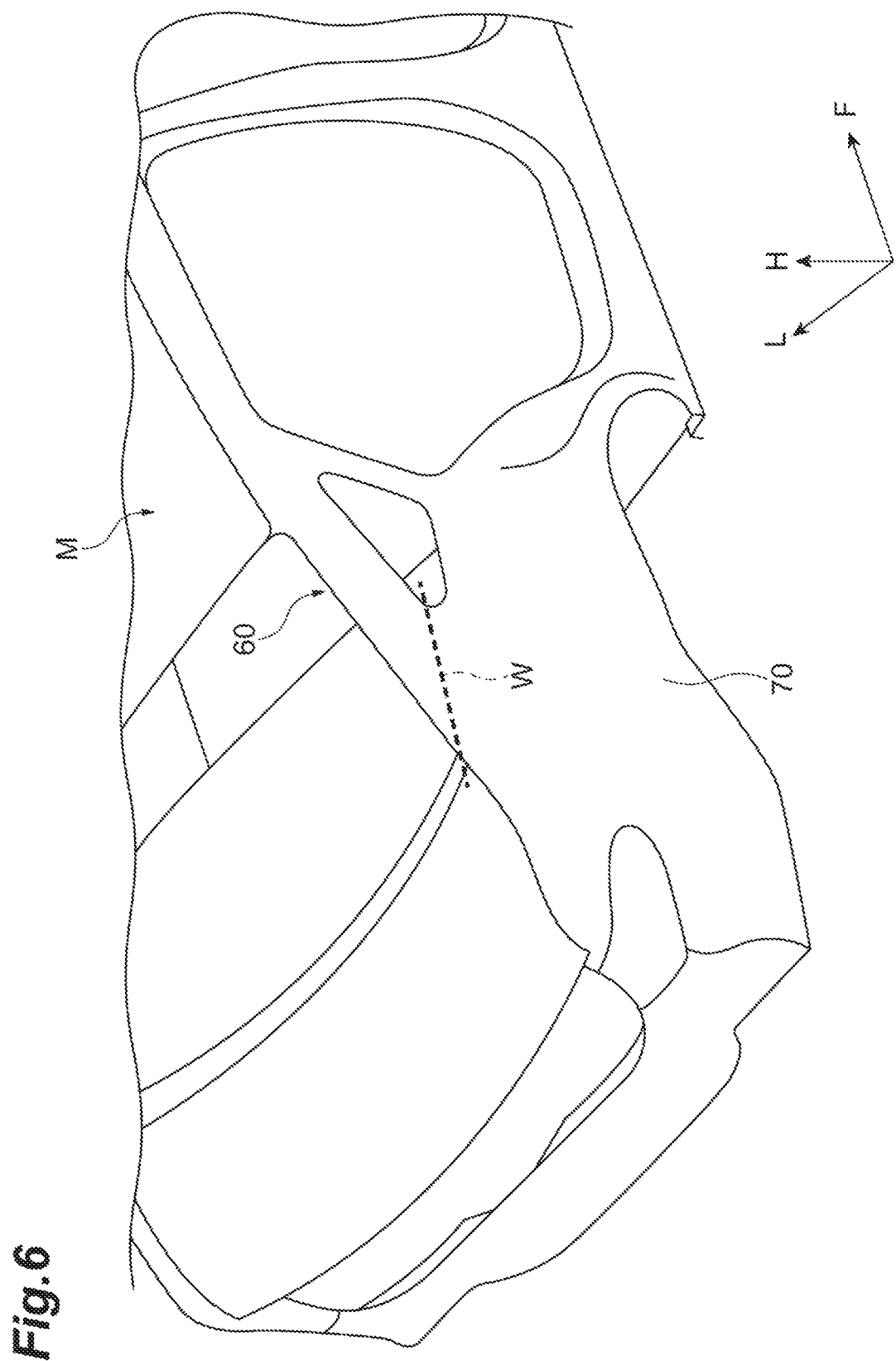
FIG. 6 is a perspective view illustrating a part of the vehicle seen from a right rear side.

The pillar structure of the present disclosure can be applied to not only a front pillar of a vehicle but also to a rear pillar of a vehicle. FIG. 6 is a perspective view illustrating a part of the vehicle seen from a right rear side. FIG. 6 illustrates a rear pillar 60 of the vehicle M, a fender panel 70 in a rear part of the vehicle, and a parting line W between the rear pillar 60 and the fender panel 70. As illustrated in FIG. 6, as an example, the rear pillar 60 and the fender panel 70 are divided into separate bodies along the parting line W and are disposed with respect to the vehicle such that the upper edge of the fender panel 70 extends in the front-rear direction of the vehicle. An effect similar to that of the front pillar 10 described above can be achieved by applying the aspect of the pillar structure of the present disclosure to this rear pillar 60. In this case, a surface of the rear pillar 60 on the rear side of the vehicle corresponds to the glass attachment surface to which the rear window of the vehicle M is attached. The side surface of the rear pillar 60 (the right side surface in FIG. 6) on the outer side of the vehicle corresponds to the side part outer surface. The upper edge of the fender panel 70 is connected to the lower part on the side part outer surface of the rear pillar 60. In such a rear pillar 60, the aspect of the pillar structure of the present disclosure can be applied to the rear pillar 60 by employing the configurations as illustrated in FIGS. 2, 3, 4, and 5A to 5D.

What is claimed is:

1. A pillar structure to which a fender panel of a vehicle is connected, the pillar structure comprising:
   a glass attachment surface configured to have a windshield of the vehicle or a rear window of the vehicle attached thereto;
   a side part outer surface configured to be positioned in a side part on the glass attachment surface and, have an upper edge of the fender panel extending in a front-rear direction of the vehicle connected thereto downwardly;
   a protruding corner portion configured to be provided to protrude to the fender panel along a pillar extending direction at a corner of a lower end on the side part outer surface on the glass attachment surface side such that an angle formed by a protruding direction and the upper edge of the fender panel is in a predetermined acute angle range in a side view; and
   a recess bead configured to be formed on the glass attachment surface along the protruding corner portion.

2. The pillar structure according to claim 1,
   wherein the recess bead is configured to extend to an lower end portion of the glass attachment surface.

* * * * *